United States Patent [19]
Adolfsson

[11] Patent Number: 5,013,945
[45] Date of Patent: May 7, 1991

[54] LINEARLY OPERATING MOTOR

[75] Inventor: Rune Adolfsson, BorÅs, Sweden

[73] Assignee: SKF Nova AB, Goteborg, Sweden

[21] Appl. No.: 416,390

[22] Filed: Oct. 2, 1989

[30] Foreign Application Priority Data

Oct. 13, 1988 [SE] Sweden .................. 8803659

[51] Int. Cl.⁵ .................. G21C 7/14; H01L 41/06; H01L 41/12
[52] U.S. Cl. .................. 310/26; 310/12; 376/228
[58] Field of Search .................. 310/26; 376/228, 229, 376/232

[56] References Cited

U.S. PATENT DOCUMENTS

| | | | |
|---|---|---|---|
| 2,506,141 | 5/1950 | Drouin | 310/26 |
| 3,138,749 | 6/1964 | Stibitz | 310/26 |
| 3,217,218 | 11/1965 | Steele | 310/328 |
| 3,349,304 | 10/1967 | Wachter | 310/26 |
| 3,894,276 | 7/1975 | Janssen | 310/15 |

FOREIGN PATENT DOCUMENTS 1005585 4/1952 France .................. 310/26
223913 12/1968 U.S.S.R. .................. 310/26

OTHER PUBLICATIONS

Proceedings of the IRE, (advertisement) The Inchworm Motor, Aug. 1957, Series 2, No. 2, p. 2a.

Primary Examiner—Steven L. Stephan
Assistant Examiner—Dennis R. Maszko
Attorney, Agent, or Firm—Eugene E. Renz, Jr.

[57] ABSTRACT

A linearly operating motor for stepwise advance of a driven member (11), such as a shaft, comprises an elongated body (10) with length variable properties, and means (15) for changing the length of said body (10). The driven member (11) is provided with at least one locking member (12), whereby at length increase of said body (10) the locking member (12) is arranged, by means of said length increase, to be brought into engagement with said driven member (11) and said body (10) is adapted to act upon the locking member (12) in such a manner the locking member and the driven member (11) are displaced at length increase of the elongated body (10).

4 Claims, 3 Drawing Sheets

LINEARLY OPERATING MOTOR

FIELD OF THE INVENTION

The present invention refers to a linearly operating motor for stepwise advance of a driven member, such as a shaft, incorporating an elongated body with length variable properties and means for altering the length of the body.

BACKGROUND OF THE INVENTION

A motor of the above mentioned type is described in Swedish patent application No. 8700219-2. In this prior motor, the elongated body has magnetostrictive properties, whereby the motion required for advancing the driven member is brought about by axial displacement of the body.

The purpose of the present invention is to provide a motor of the type mentioned in the introduction, wherein the elongated body is stationary and the motion required for effecting the advance of the driven member is obtained by means of the elongation of the body.

SUMMARY OF THE INVENTION

A motor according to the invention is inteded to be used e.g. where high precision is required for the motion generated, such as at traversing motors for precision adjustment and where the requirements for stroke length and power generation are rather small but also at applications, where longer stroke and larger power generation are required, such as in actuation of hoisting mechanisms. To this end the invention comprises an elongated body 10 with length variable properties, and means for changing the length of said body (10), said driven member 11 being provided with at least a first locking means 12, said first locking means 12, upon length increase of said body 10, being adapted to be brought into engagement with said driven member 11 by means of said length increase and said body 10 being adapted to act upon the first locking means 12 in such a manner that said locking means and thereby also said driven member 11 are displaced at length increase of the body 10.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
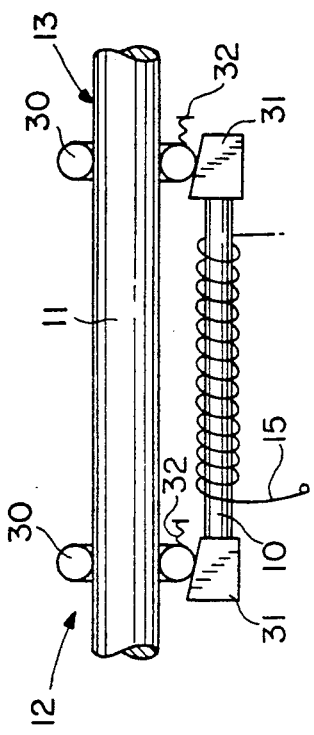
FIG. 1 illustrates the invention in its most general form.

Details corresponding to each other have been given the same reference numerals in the various figures.

Linearly operating motors according to the invention relate to passive forms of actuator applications, i.e. the length increase of the elongated body is transferred to the driven member via a gripping device in such a manner that driven member is subjected to a step-wise advance. A motor working in accordance with the step-advance principle is generally illustrated in FIG. 1, whereby one or more, elongated bodies 10 having length variable properties are arranged to advance a shaft 11 step-wise. In the illustrated embodiment, two body members 10 are shown. Two locking members 12, 13 are arranged to be brought into engagement with the shaft 11. The locking member 12 thereby seizes the shaft 11, whereupon the feeding units 10 advance the shaft. The locking member 13 then seizes the shaft 11, whereupon the locking member 12 releases its grip about the shaft and the feeding units 10 resume their initial length.

Even though the general application of the invention in FIG. 1 is illustrated in connection with two locking members, it is however possible, to effect the desired advance of the shaft 11 by means of one locking member only as described hereafter. An essential feature of the invention is that the locking member 12 and the elongated body 10 are designed mutually in such a manner that the locking member due to the length increase of the body is brought to engagement with the driven member 11. The locking member 12 then is designed with a freewheel function thus that the grip of the locking member about the member 11 terminates when the body 10 resumes its initial length.

The invention is intended to be applied primarily in applications where the feeding units 10 are bodies having such magnetostrictive properties that the bodies will undergo a length increase under influence of a magnetic field. Such magnetostrictive materials and the influence given to them by magnetic fields are described in detail in Swedish patent application No. 8700219-2, and therefore the contents of that patent application are incorporated in the present description.

The invention, however, is generally applicable in combination with other stationary elongated bodies with length variable properties. An example on such bodies is a rod or a bundle of threads of memory metal, which undergo a length change at a certain temperature.

Figure 2:
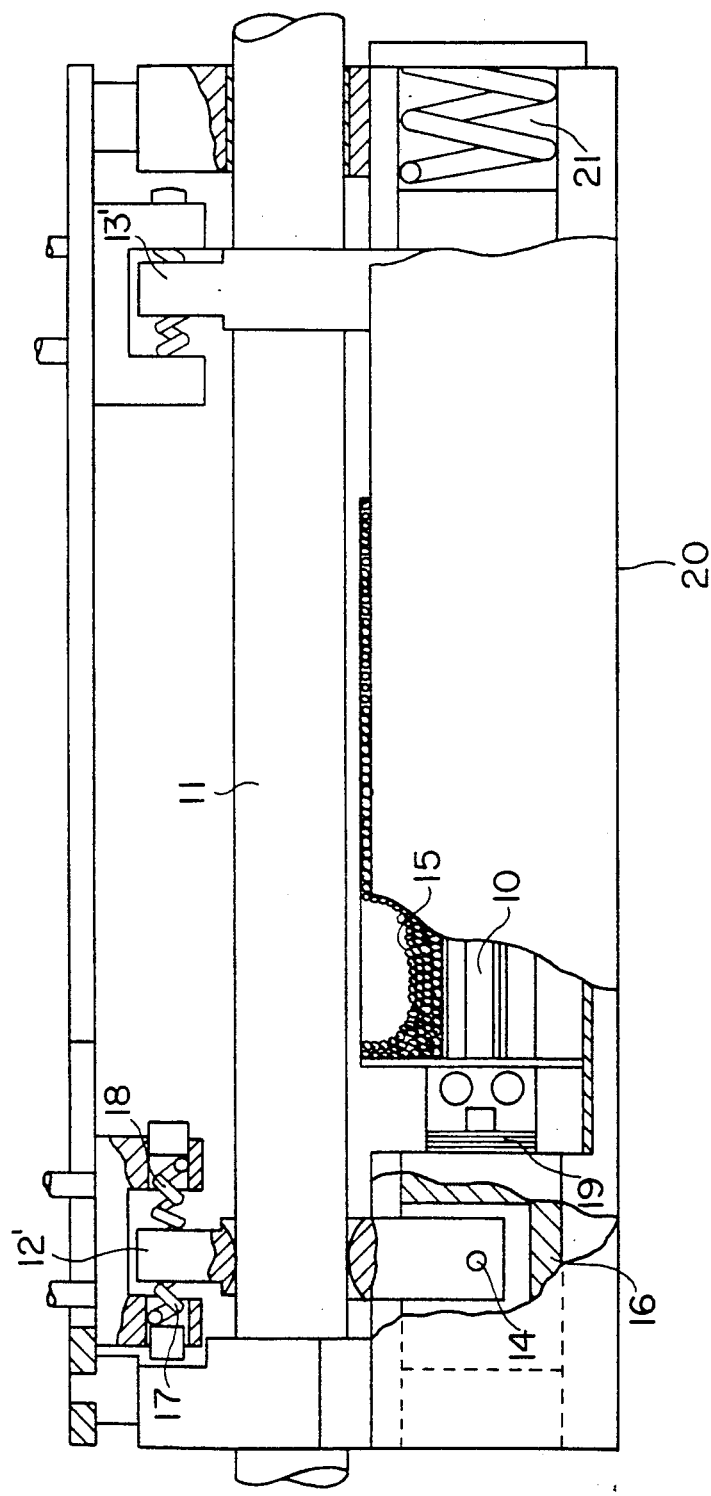

In accordance with the embodiment shown in FIG. 2, the locking members 12, 13 are pivotably supported about pivot axles 14 and designed with through-holes for the shaft 11. At generation of a magnetic field by means of a coil 15 the length of the magnetostrictive rod 10 will increase. The length increase of the rod is transferred to a guide 16, in which the axle 14 is supported. Upon length increase of the rod 10 and the following displacement of the axle 14, the locking member 12 in the initial stage of the length increase will be tilted, whereby a firm grip will be obtained between the shaft 11 and the edges of the hole in the locking member. The locking member 12 thereupon will be displaced by the rod 10 in the direction of the shaft 11 and it thereby will pull along the shaft 11. When the magnetic field around the rod 10 ceases, the rod will resume its initial length. The locking member 12 thereupon first moves back to its direction mainly perpendicular to the shaft 11 as shown in FIG. 2, whereupon the locking member 12 is moved backwards relative to the shaft 11, as seen in the advance direction thereof.

If there are no axial loads acting upon the rod 11 in a direction opposed to the advance direction thereof, or the axial loads are small it is possible to advance the rod 11 by means of a single locking member 12. If large axial loads are present, it is possible to provide a second locking member 13 at the opposite end of the rod 11. The locking member 13 is arranged not to be displaced axially at advance of the rod 11 but only to change its pivot position relative to the shaft 11 depending upon whether the locking member 13 shall lock or not. The locking members 12, 13 thus operate alternatively in such a manner that the locking member 13 is disengaged due to movement of the shaft when the locking member 12 is engaged and moves the shaft 11. When the locking member 12 thereupon is returned to take a new grip, the locking member 13 will lock.

The locking members 12, 13 are spring loaded in an axial direction by means of springs 17, 18 and radially from below by means of springs (not shown) for improving the locking effect. The axial movement of the rod 10, which is required before locking occurs thereby becomes smaller.

A part of the magnetic field generated in the coil 15 is arranged to be "recovered" by means of a magnetic return cable 19, which contacts both short ends of the rod 10. The movement of the rod 10 is transferred via the return cable 19 to the guides 16 at the two short ends of the rod. The function of the guides 16 is, beside transferring the power to the locking members 12, 13 via the axles 14, to guide the movement of the axles 14 thus that this will occur in the longitudinal direction of the shaft 11. The motor housing 20 is designed in such a manner that the shaft 11 can be fed in both directions. When feeding the shaft in the left-hand direction in FIG. 1, the right-hand guide 16 due to the load is pushed to a bottom position, which as mentioned above means that only the locking member 12 moves to and fro, whereas the locking member 13 only changes its angular position if this shall be locked or not.

In order to maximize the longitudinal expansion of the rod 10, caused by the magnetic field, it is required a pretension of the rod in its longitudinal direction. In the embodiment shown this pretension is generated by means of a spring 21 acting upon the rearmost, i.e. the right hand guide 16 in FIG. 2.

Figure 3:
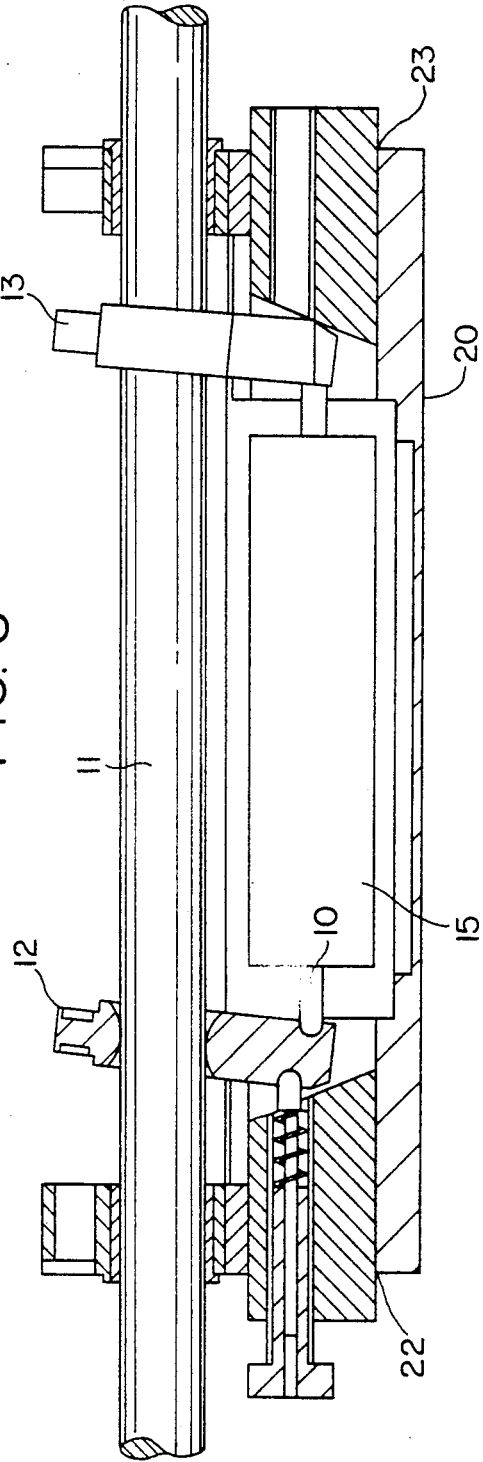

In FIG. 3 is shown a modification of the step-wise advance annular oscillator in FIG. 2, wherein the rod 10 acts directly upon the locking member 12. The pretension of the rod 10 and the returning of the locking member 12 after terminated step-wise advance of the shaft 11 are effected by means of a spring 22. The reaction force from the spring 22 is transferred via the rod 10 and the rearmost locking 13 to a counter-stay 23 in the housing 20.

In the embodiment shown in FIG. 3, the rod 10 rests against the locking 13. If desired, this embodiment may be modified in such a manner that the rod 10 is adapted to rest on a fixed surface in the housing 20. At advance of the shaft 11 the rod 10 and the locking 12 thereby are the only movable parts. For locking the freewheel 13 to the shaft 11 this is connected with a tension spring, the other end of which is attached to the housing 20.

Figure 4:
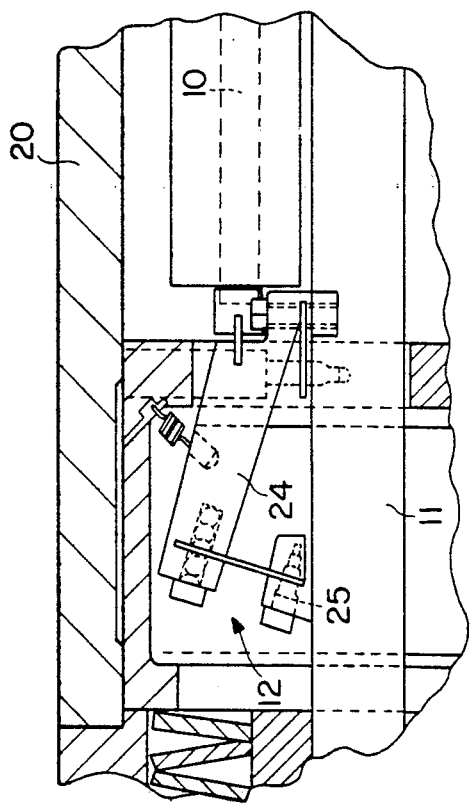

In accordance with the embodiment shown in FIG. 4, the shaft 11 is advanced by means of a locking member 12 in the form of a gear unit 24, 25. At length increase of the rod 10, a lever 24 connected thereto and forming part of the gear unit is arranged to pivot in a direction towards the shaft 11. The lever 24 is connected to a friction element 25 in such a manner that the friction element 25 advances the shaft 11 at pivoting of the lever 24. In the embodiment shown, the lever ratio and that angle of the friction element 25 are such that a step-up of the extension of the rod 10 in the order of ten (10) times is obtained.

Figure 5:
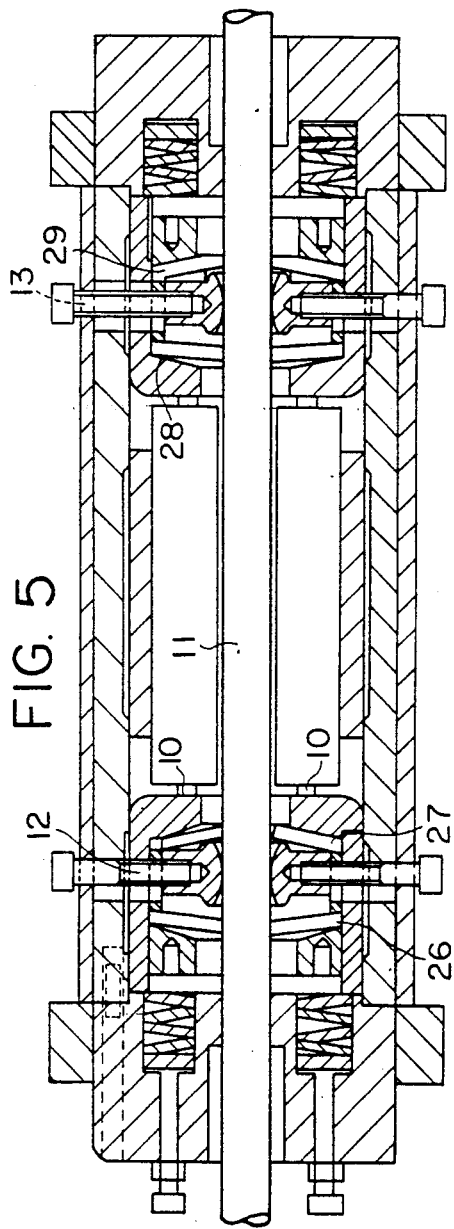

In accordance with the embodiment shown in FIG. 5, the locking members 12, 13 incorporate gripping membranes 26, 27, 28, 29. At extension of the rods 10, the gripping membrane 26 in engagement with the shaft 11 advances this, whereby the gripping membrane 28 allows the shaft 11 to pass. At return movement of the rods 10 the gripping membrane 26 is released from the shaft 11, whereby the gripping membrane holds the shaft load.

Figure 6:
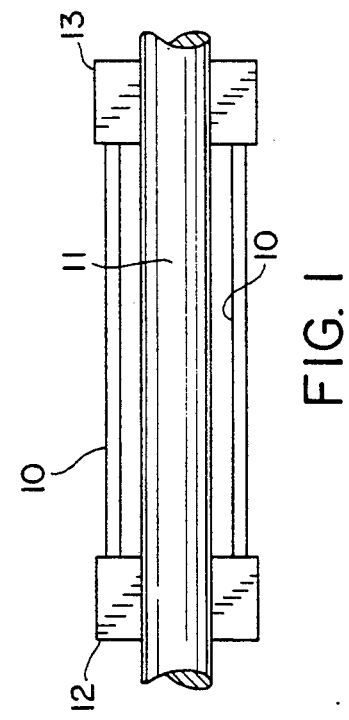
FIGS. 2-6 inclusive show different embodiments of motors according to the invention.

In accordance with the embodiment shown in FIG. 6, the locking members 12, 13 incorporate an annular member 30 and a wedge member 31. The annular member 30 is pressed against the wedge member 31 by means of a spring 32. When the rod 10 is subjected to extension the right hand wedge member 31 as seen in FIG. 6 is pressed against the annular member 30, which is pressed against the shaft 11 and thereby grips this and displaces the shaft. At return movement of the rod 10 to initial length the shaft 11 is prevented from moving in its advance direction by means of the locking member 12. By designing the wedge members 31 in an appropriate manner with two opposed wedge surfaces it is possible to feed the shaft 11 in both directions.

What is claimed is:

1. A linearly operating motor for stepwise advance of a driven member (11), such as a shaft, comprising an elongated body (10) with length variable properties, and means for changing the length of said body (10), said driven member (11) being provided with at least a first pivotally mounted locking means (12) and having a through-hole to drive said driven member (11), said first locking means (12), upon length increase of said body (10), being adapted to first swing so that a grip is obtained between said driven member (11) and hole and adapted to move said locking means (12) and the driven member (11) in the advance direction thereof.

2. A linearly operating motor for stepwise advance of a driven member (11), such as a shaft, comprising an elongated body (10) with length variable properties, and means for changing the length of said body (10), said driven member (11) being provided with at least a first locking means (12), said first locking means (12), upon length increase of said body (10), being adapted to be brought into engagement with said driven member (11) by means of said length increase and said body (10) being adapted to act upon the first locking means (12) in such a manner that said locking means and thereby also said driven member (11) are displaced at length increase of the body (10), said locking means comprising a ring (30) having a through-hole for the driven member (11) and a wedge (31) with a wedge surface adapted to rest against the ring (30), whereby at length increase of the elongated body, the wedge (31) is adapted to first press the ring (30) against the driven member (11) and then to displace the driven member (11) in the advance direction thereof.

3. A linearly operating motor for stepwise advance of a driven member (11), such as a shaft, comprising an elongated body (10) with length variable properties, and means for changing the length of said body (10), said driven member (11) being provided with at least a first locking means (12), said first locking means (12), upon length increase of said body (10), being adapted to be brought into engagement with said driven member (11) by means of said length increase and said body (10) being adapted to act upon the first locking means (12) in such a manner that said locking means and thereby also said driven member (11) are displaced at length increase of the body (10), said locking means comprising a first pivotally arranged element (24) and a friction element (25) connected thereto and intended for engagement with the driven member (11), whereby the elongated body (10) at its length increase is arranged to swing the first element (24) in a direction towards said driven member (11) by first forcing the friction element (25) to abutment against the driven member (11) and then advancing the driven member (11).

4. A motor as claimed in claim 1, wherein the locking means 12 is displaced against the action of a resilient element (22), which is adapted to apply a pretensioning force upon the elongated body (10).

* * * * *